US012683894B2

(12) United States Patent
Shew et al.

(10) Patent No.: US 12,683,894 B2
(45) Date of Patent: Jul. 14, 2026

(54) FLEXIBLE ETHERNET OVER WIRELESS LINKS

(71) Applicant: Ciena Corporation, Hanover, MD (US)

(72) Inventors: Stephen Daniel Shew, Ottawa (CA); Sebastien Gareau, Ottawa (CA); Petar Djukic, Nepean (CA)

(73) Assignee: Ciena Corporation, Hanover, MD (US)

( * ) Notice: Subject to any disclaimer, the term of this patent is extended or adjusted under 35 U.S.C. 154(b) by 74 days.

(21) Appl. No.: 16/561,485

(22) Filed: Sep. 5, 2019

(65) Prior Publication Data

US 2021/0076111 A1     Mar. 11, 2021

(51) Int. Cl.
*H04L 45/00*     (2022.01)
*H04B 10/11*     (2013.01)
*H04J 14/08*     (2006.01)
*H04L 12/46*     (2006.01)
(Continued)

(52) U.S. Cl.
CPC .............. *H04L 45/66* (2013.01); *H04B 10/11* (2013.01); *H04L 12/4633* (2013.01); *H04L 69/324* (2013.01); *H04Q 11/0005* (2013.01); *H04Q 11/0062* (2013.01); *H04Q 11/0067* (2013.01);
(Continued)

(58) Field of Classification Search
None
See application file for complete search history.

(56) References Cited

U.S. PATENT DOCUMENTS

| | | | | |
|---|---|---|---|---|
| 8,078,109 B1 * | 12/2011 | Mulcay | ................. | H04W 24/02 |
| | | | | 455/445 |
| 8,867,913 B2 | 10/2014 | Gareau et al. | | |
| 9,800,361 B2 | 10/2017 | Gareau et al. | | |

(Continued)

FOREIGN PATENT DOCUMENTS

| | | |
|---|---|---|
| EP | 3393136 A1 | 10/2018 |
| EP | 3531643 A1 | 8/2019 |

(Continued)

OTHER PUBLICATIONS

Nov. 12, 2020 International Search Report and Written Opinion for International Application No. PCT/US2020/048335.
(Continued)

*Primary Examiner* — Derrick W Ferris
*Assistant Examiner* — Keith Follansbee
(74) *Attorney, Agent, or Firm* — Baratta Law PLLC; Lawrence A. Baratta, Jr.

(57) ABSTRACT

A mapper includes circuitry configured to receive data streams each or which is a stream of data based on a calendar function associated with one of Flexible Ethernet (FlexE) or Metro Transport Networking (MTN); and circuitry configured to perform mapping of each of the data streams and to provide an output of the mapping to a device in a wireless data plane for transmission over one or more wireless links. The mapping can include packet mapping where the stream of blocks is encapsulated into packets. The mapping can include byte mapping where the stream of blocks is converted into a byte stream that is provided to a Radio Link Control (RLC) layer that guarantees byte delivery in order at a receiver. The mapping can also include bit mapping wherein the stream of blocks is transferred as a stream of bits to a transport buffer Service Access Point (SAP).

20 Claims, 6 Drawing Sheets

(51) Int. Cl.

*H04L 69/324*     (2022.01)

*H04Q 11/00*     (2006.01)

(52) U.S. Cl.

CPC ........ *H04J 14/08* (2013.01); *H04Q 2011/002* (2013.01); *H04Q 2011/0086* (2013.01)

(56)         References Cited

U.S. PATENT DOCUMENTS

| | | | |
|---|---|---|---|
| 9,838,290 | B2 | 12/2017 | Gareau |
| 10,097,480 | B2 | 10/2018 | Gareau et al. |
| 10,116,403 | B2 | 10/2018 | Gareau et al. |
| 10,135,760 | B2 | 11/2018 | Gareau |
| 10,193,688 | B2 | 1/2019 | Gareau et al. |
| 10,218,823 | B2 | 2/2019 | Gareau |
| 10,225,037 | B2 | 3/2019 | Gareau |
| 10,256,909 | B2 | 4/2019 | Gareau et al. |
| 10,313,103 | B1 | 6/2019 | Perras et al. |
| 11,032,024 | B2 * | 6/2021 | Wu ........................ H04L 1/0057 |
| 2005/0141480 | A1 * | 6/2005 | Jin ......................... H04W 92/02 |
| | | | 370/351 |
| 2008/0225893 | A1 * | 9/2008 | Cave ..................... H04L 1/1874 |
| | | | 370/476 |
| 2009/0318127 | A1 * | 12/2009 | Yi ......................... H04L 1/1829 |
| | | | 455/422.1 |
| 2016/0119075 | A1 | 4/2016 | Gareau et al. |
| 2018/0123765 | A1 * | 5/2018 | Cao ....................... H04L 5/0055 |
| 2018/0139774 | A1 * | 5/2018 | Ma ........................ H04L 1/1893 |
| 2018/0167160 | A1 | 6/2018 | Gareau et al. |
| 2018/0183723 | A1 * | 6/2018 | Cariou ................ H04L 12/4633 |
| 2018/0249466 | A1 * | 8/2018 | Cai ....................... H04L 27/362 |
| 2018/0323909 | A1 * | 11/2018 | Ying ..................... H04L 1/1822 |
| 2019/0173856 | A1 | 6/2019 | Gareau et al. |
| 2019/0319742 | A1 * | 10/2019 | Wu ........................ H04L 1/0013 |
| 2020/0169350 | A1 * | 5/2020 | Zhang ................... H04L 1/0061 |
| 2020/0177341 | A1 * | 6/2020 | Li ......................... H04W 72/0446 |
| 2020/0220650 | A1 * | 7/2020 | Cheng ................... H04L 1/0023 |
| 2020/0229231 | A1 * | 7/2020 | Oh ......................... H04W 80/08 |
| 2020/0328767 | A1 * | 10/2020 | Zhong .................... H03M 7/30 |
| 2020/0351725 | A1 * | 11/2020 | Kim ...................... H04W 80/02 |
| 2021/0091871 | A1 * | 3/2021 | Deng ..................... H04J 3/1694 |
| 2021/0111933 | A1 * | 4/2021 | Xiao ..................... H04J 3/1658 |
| 2021/0120622 | A1 * | 4/2021 | Fujishiro ............. H04W 74/006 |
| 2021/0306272 | A1 * | 9/2021 | Liao ...................... H04W 16/02 |
| 2021/0307036 | A1 * | 9/2021 | Myung ................. H04L 5/0053 |
| 2021/0336893 | A1 * | 10/2021 | Li ......................... H04L 47/2425 |

FOREIGN PATENT DOCUMENTS

| | | | |
|---|---|---|---|
| WO | 2019100982 | A1 | 5/2019 |
| WO | 2019128664 | A1 | 7/2019 |

OTHER PUBLICATIONS

OIF, Flex Ethernet Implementation Agreement, IA # OIF-FLEXE-01.1, Jun. 21, 2017.

OIF, Flex Ethernet Implementation Agreement, IA # OIF-FLEXE-02.0, Jun. 22, 2018.

Yubomirsky et al., Baseline Proposal for 400G/80km, IEEE P802.3cn Task Force Meeting, Nov. 12-13, 2018.

Lyubomirsky et al., 400G FEC and Framing for 80km, Sep. 10, 2018.

\* cited by examiner

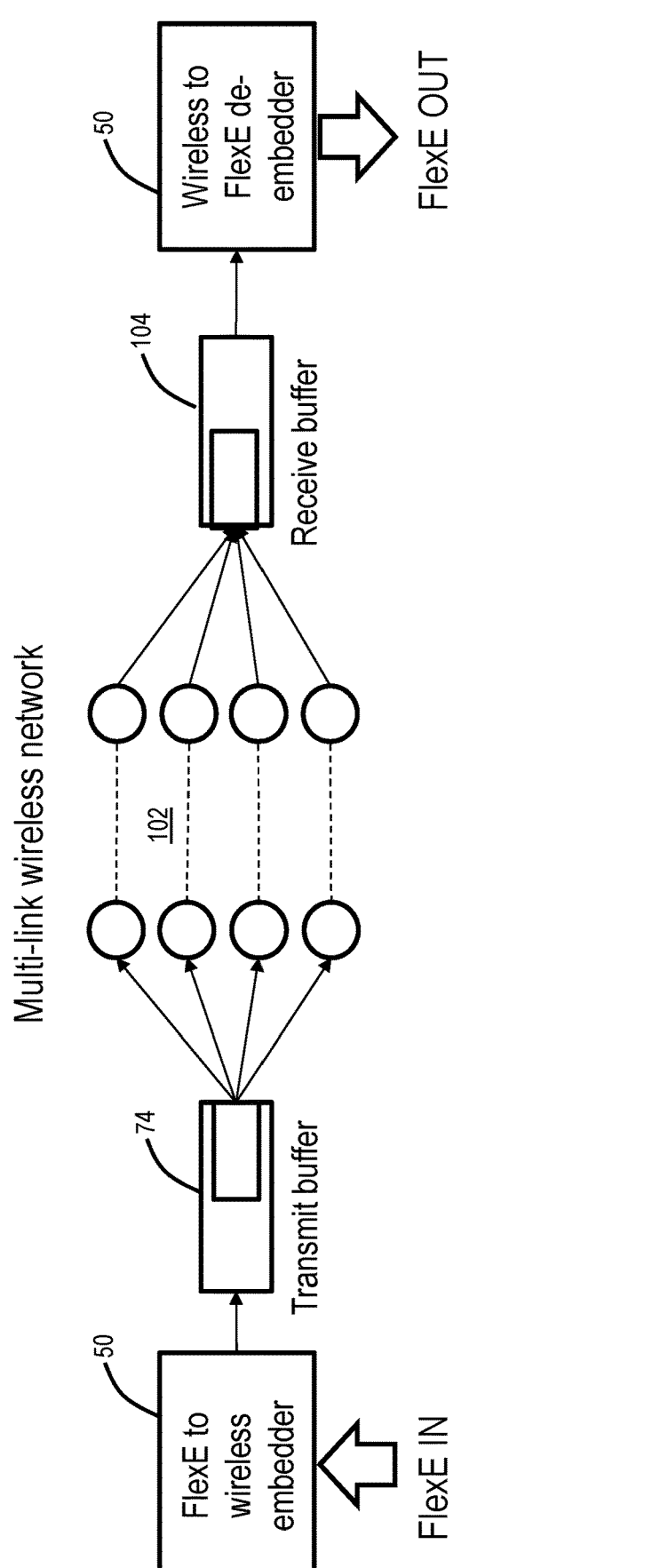
_FIG. 4_

S1
RECEIVING DATA LANE STREAMS EACH INCLUDING A STREAM OF BLOCKS ASSOCIATED WITH ONE OF A FLEXIBLE ETHERNET (FLEXE) SIGNAL OR A METRO TRANSPORT NETWORKING (MTN) SIGNAL

S2
MAPPING THE STREAM OF BLOCKS TO DATA FORMATTED FOR TRANSMISSION OVER ONE OR MORE WIRELESS LINKS BY A TRANSMIT DEVICE IN A WIRELESS DATA PLANE

S3
RECEIVING THE FORMATTED DATA FROM A RECEIVE DEVICE IN THE WIRELESS DATA PLANE

S4
DEMAPPING THE RECEIVED DATA TO THE STREAM OF BLOCKS RECONSTITUTING THE ONE OF THE FLEXE SIGNAL AND THE MTN SIGNAL

*FIG. 5*

FLEXIBLE ETHERNET OVER WIRELESS LINKS

FIELD OF THE DISCLOSURE

The present disclosure generally relates to networking. More particularly, the present disclosure relates to systems and methods for Flexible Ethernet (FlexE) over wireless links.

BACKGROUND OF THE DISCLOSURE

Flexible Ethernet (FlexE) is a link multiplexing technology initially specified in the Optical Internetworking Forum's Flexible Ethernet Implementation Agreement (document OIF-FLEXE-01.0, March 2016, OIF-FLEXE-01.1, June 2017, and OIF-FLEXE-02.0, June 2018, the contents of each is incorporated by reference herein). The Implementation Agreement (IA) enables one or more 100GBASE-R PHYs to be bonded, with clients of 10, 40, and m×25 Gb/s. The bonded 100GBASE-R PHYs are known as a FlexE Group. Also, MTN (metro transport networking) is being developed in the International Telecommunication Union (ITU) as G.mtn "Interfaces for a metro transport network." MTN has also been historically called "Flexible Ethernet (FlexE) switching" or "Slicing packet Networking (SPN)." FlexE and G.mtn have not been proposed or described for operation over wireless links. That is, FlexE is specified for optical/wired links only utilizing standard IEEE 802.3 Ethernet PMDs/PHYs.

There are conventional approaches that utilize a modified Ethernet Link Aggregation Group (LAG) to bond multiple wireless channels. This increases link capacity and reliability. FlexE is advantageous over Ethernet LAG as it can support client streams greater than the speed of the constituent LAG flows. Also, FlexE does not introduce inefficiencies typically introduced by LAG due to hashing algorithms.

BRIEF SUMMARY OF THE DISCLOSURE

In an embodiment, a mapper includes circuitry configured to receive data streams each is a stream of data based on a calendar function associated with one of Flexible Ethernet (FlexE) and Metro Transport Networking (MTN); and circuitry configured to perform mapping of each of the data streams and to provide an output of the mapping to a device in a wireless data plane for transmission over one or more wireless links. The stream of data can include a stream of blocks sized based on a line encoding technique. The mapping can include packet mapping where the stream of blocks is encapsulated into packets each having a sequence number to ensure correct ordering at a receiver, and the packets can be provided to the wireless data plane at a Packet Data Convergence Protocol (PDCP) layer in the wireless data plane. The mapping can include byte mapping where the stream of blocks is converted into a byte stream that is provided to a Radio Link Control (RLC) layer in the wireless data plane that guarantees byte delivery in order at a receiver. The mapping can include bit mapping wherein the stream of blocks is transferred as a stream of bits to a transport buffer Service Access Point (SAP) in the wireless data plane. The stream of data can include a stream of 64B/66B blocks, and wherein the data streams are each about 5 Gb/s corresponding to one of 20 calendar slots in a 100 Gb/s FlexE frame. The data streams can be a plurality of streams and each is transported over portions of different wireless links.

In another embodiment, a system includes a mapper configured to receive data streams each including a stream of blocks associated with one of a Flexible Ethernet (FlexE) signal or a Metro Transport Networking (MTN) signal, and map the stream of blocks to data formatted for transmission over one or more wireless links by a transmit device in a wireless data plane; and a demapper configured to receive the formatted data from a receive device in the wireless data plane, and demap the received data to the stream of blocks reconstituting the one of the FlexE signal and the MTN signal. The data formatted can include packet mapping where the stream of blocks is encapsulated into packets each having a sequence number to ensure correct ordering at the demapper, and the packets can include provided to the wireless data plane at a Packet Data Convergence Protocol (PDCP) layer in the wireless data plane. The data formatted can include byte mapping where the stream of blocks is converted into a byte stream that is provided to a Radio Link Control (RLC) layer in the wireless data plane that guarantees byte delivery in order at the demapper. The data formatted can include bit mapping wherein the stream of blocks is transferred as a stream of bits to a transport buffer Service Access Point (SAP) in the wireless data plane. The stream of data can include a stream of 64B/66B blocks, and wherein the data streams are each about 5 Gb/s corresponding to one of 20 calendar slots in a 100 Gb/s FlexE frame. The data streams can be a plurality of streams and each is transported over a different wireless link. The system can further include a transmit buffer between the mapper and the wireless data plane; and a receive buffer between the demapper and the wireless data plane.

In a further embodiment, a method includes receiving data streams each including a stream of blocks associated with one of a Flexible Ethernet (FlexE) stream or a Metro Transport Networking (MTN) stream; and mapping the stream of blocks to data formatted for transmission over one or more wireless links by a transmit device in a wireless data plane. The method can further include receiving the formatted data from a receive device in the wireless data plane; and demapping the received data to the stream of blocks reconstituting the one of the FlexE signal or the MTN signal. The data formatted can include packet mapping where the stream of blocks is encapsulated into packets each having a sequence number to ensure correct ordering at a receiver, and the packets can be provided to the wireless data plane at a Packet Data Convergence Protocol (PDCP) layer in the wireless data plane. The data formatted can include byte mapping where the stream of blocks is converted into a byte stream that is provided to a Radio Link Control (RLC) layer in the wireless data plane that guarantees byte delivery in order at a receiver. The data formatted can include bit mapping wherein the stream of blocks is transferred as a stream of bits to a transport buffer Service Access Point (SAP) in the wireless data plane. The method can further include buffering the data formatted prior to transmission; and controlling the buffering based on the one or more wireless links.

BRIEF DESCRIPTION OF THE DRAWINGS

The present disclosure is illustrated and described herein with reference to the various drawings, in which like reference numbers are used to denote like system components/method steps, as appropriate, and in which.

3

Figure 2A:
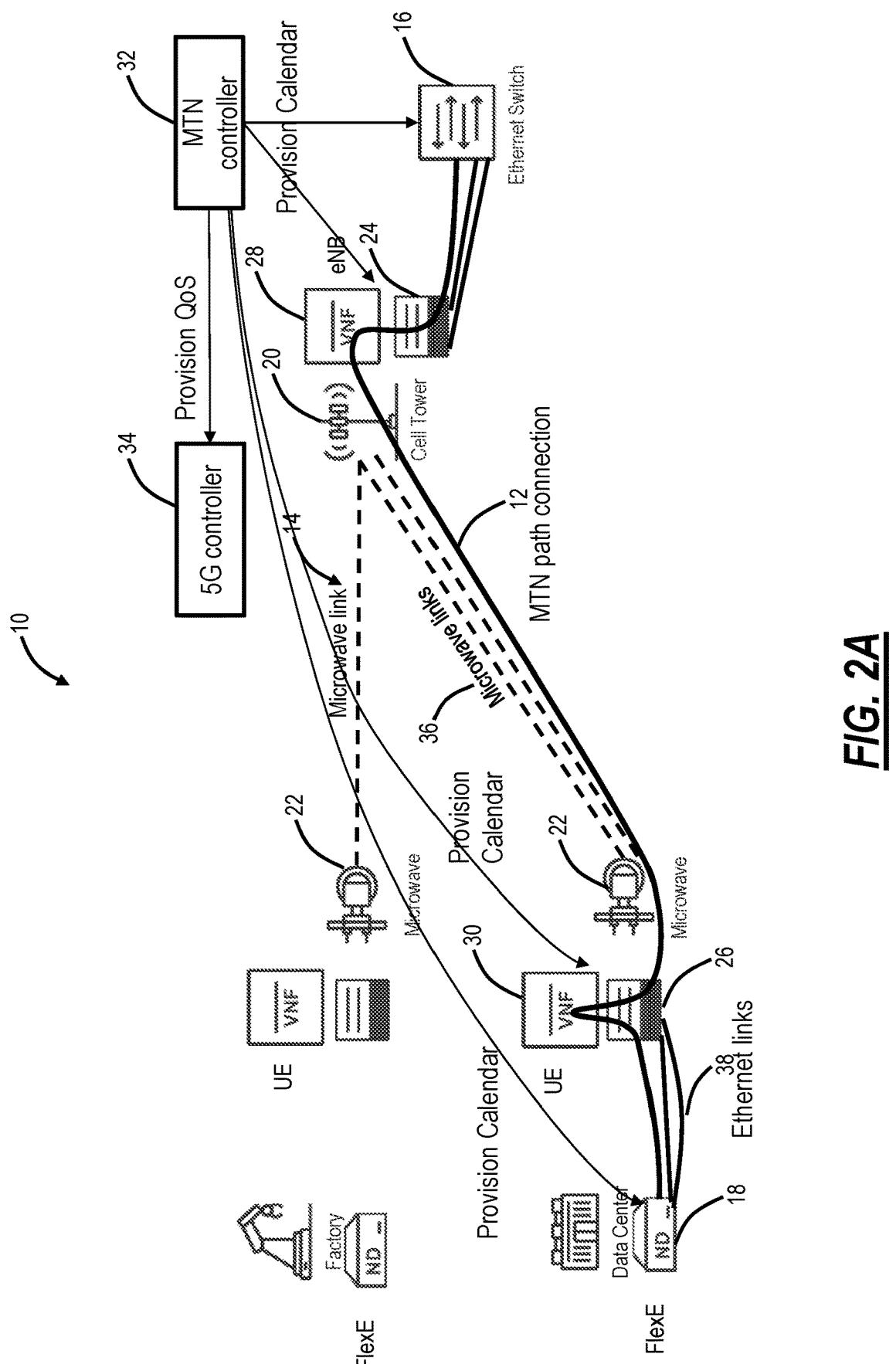
Figure 2B:
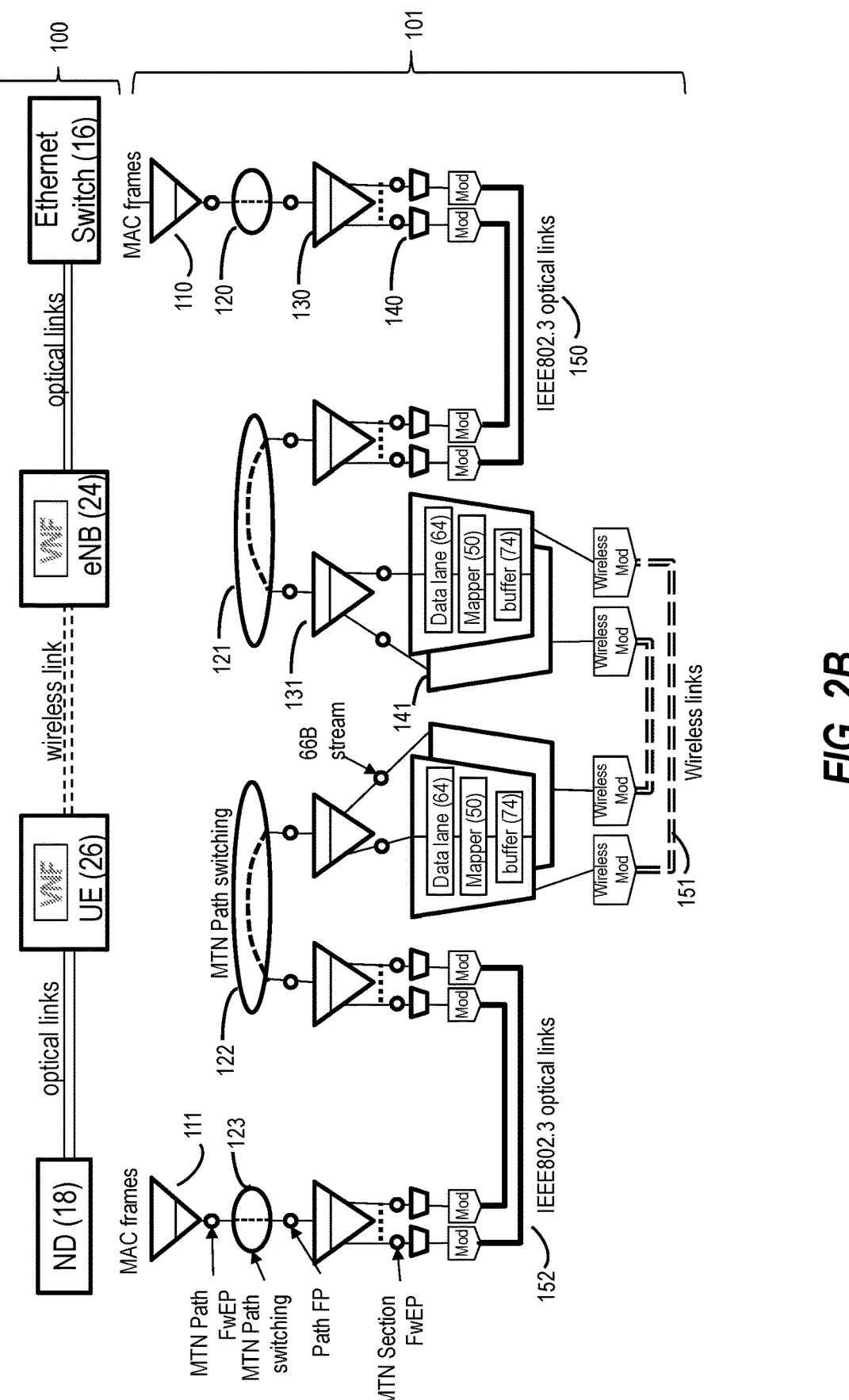
Figure 3:
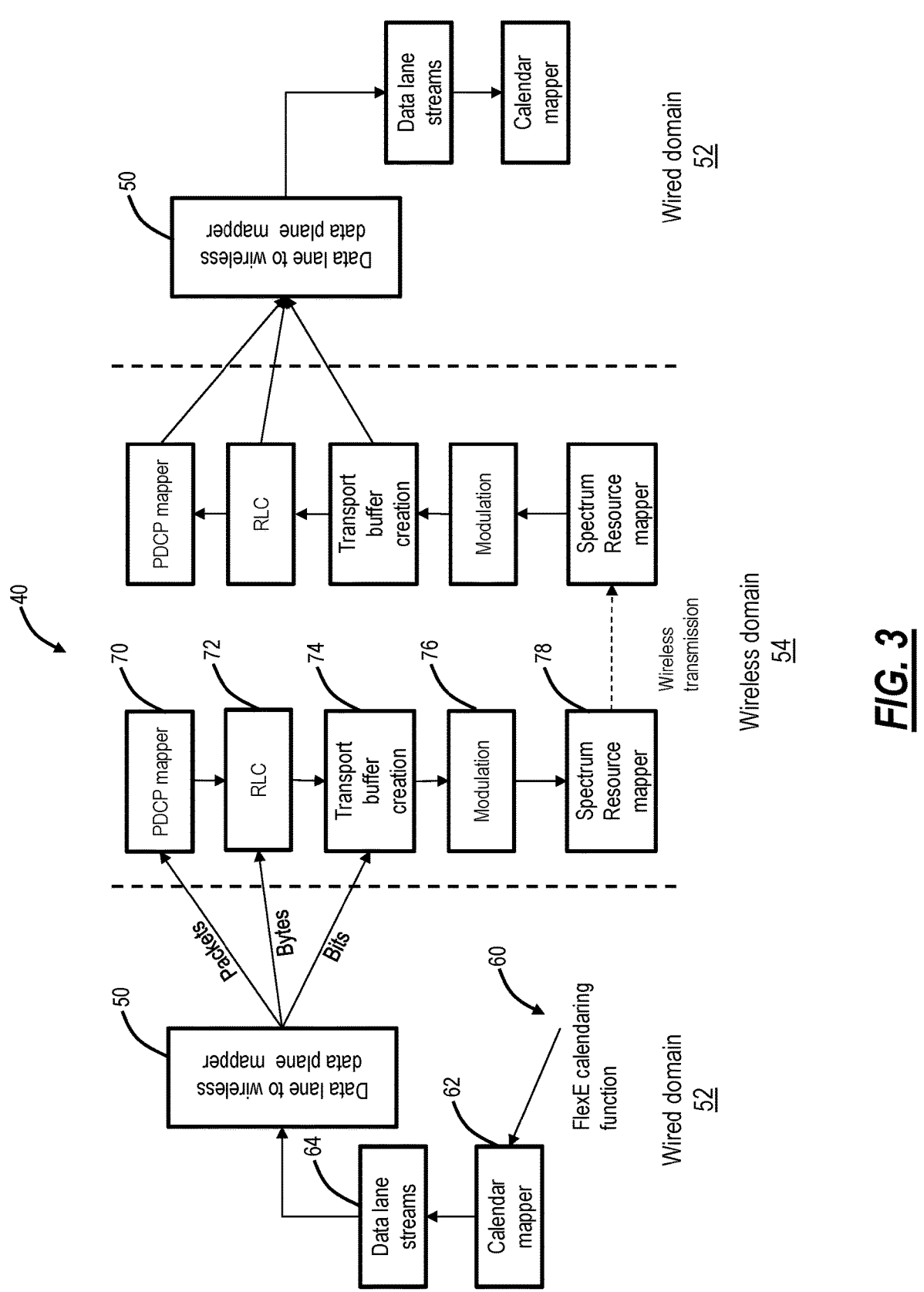

FIG. 2A is a network diagram of a network illustrating an end-to-end Metro Transport Networking (MTN) circuit utilizing a 5G wireless point to multi-point link as part of its path;

FIG. 2B is a network diagram illustrating the devices and links of MTN circuit of FIG. 2A and the IEEE 802.3 stack and ITU-T architectural views;

FIG. 3 is a block diagram of a system configured to interface 64B/66B blocks between wireless frames via a mapper between a wired domain and a wireless domain;

FIG. 4 is a block diagram of a multi-link wireless network; and

FIG. 5 is a flowchart of a FlexE/MTN transmission process over a wireless data plane.

DETAILED DESCRIPTION OF THE DISCLOSURE

The present disclosure relates to systems and methods for Flexible Ethernet (FlexE) over wireless links. The present disclosure substitutes the lower part of an Ethernet PHY below the FlexE calendar function, with a wireless link. This enables the advantages of a FlexE Group (channelization, bonding, and subrating) to a set of wireless links. It can also provide end-to-end hard slicing across multiple different media types (e.g., optical and wireless). The addition of wireless links could increase the topology options for Ethernet networks, e.g., topologies of Ethernet links and wireless links could be created. Support of FlexE clients over such topology is beneficial for client rates that do not exactly match the physical rates. Wireless links may be advantageous in some situations where optical fiber is not present or would be expensive to deploy.

Figure 1:
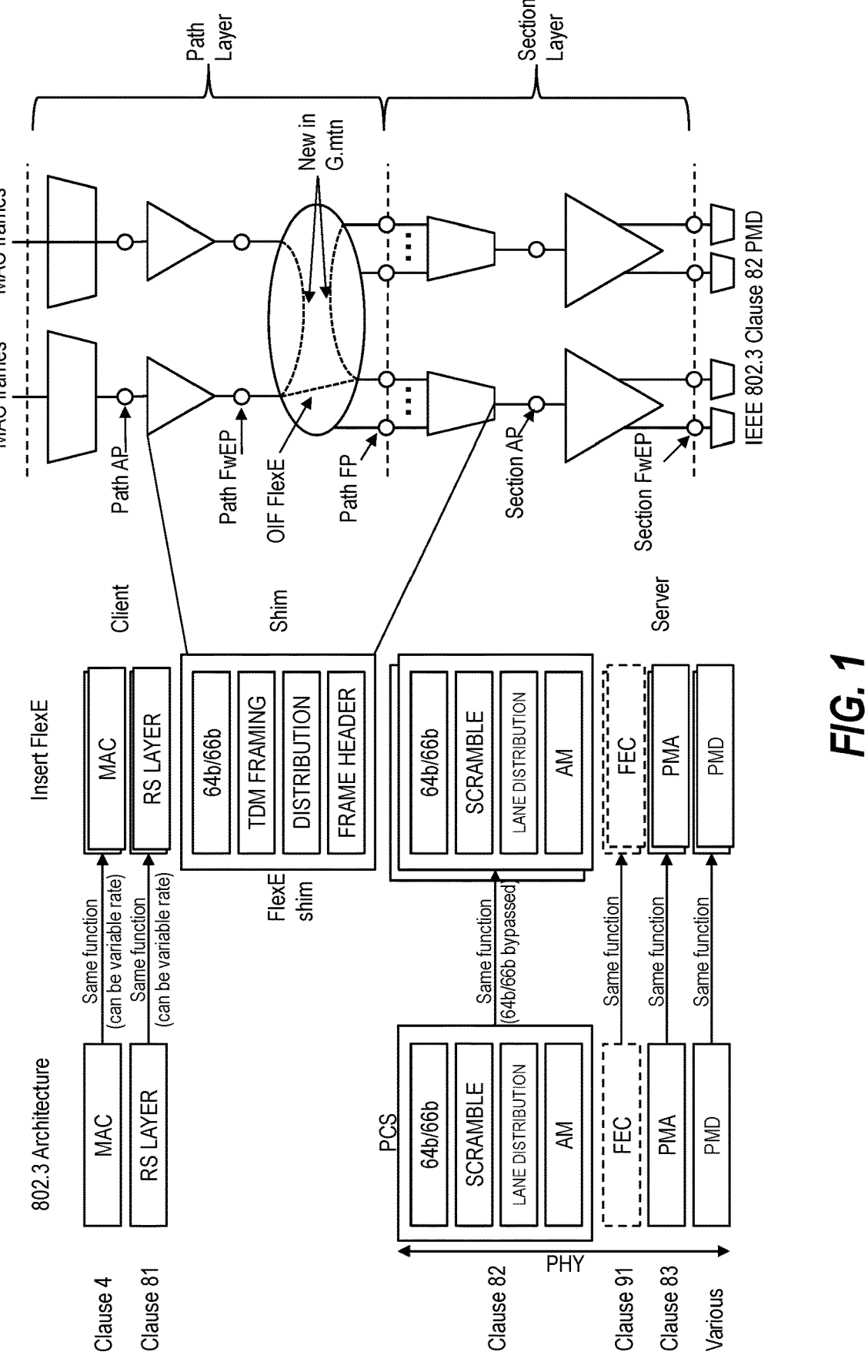
FIG. 1 is a diagram of the IEEE 802.3 stack and ITU-T architectural views of FlexE and MTN.

FIG. 1 is a diagram of the IEEE 802.3 stack and ITU-T architectural views of FlexE and MTN. The technology enabling FlexE is the FlexE shim, which is an adaptation of a 64B/66B encoded bit-stream into a Time Division Multiplexing (TDM) like structure across a FlexE group. Each FlexE client has its own bit rate, Media Access Control (MAC), and Reconciliation layers, and Media-Independent Interface (xMII) above the FlexE shim. 64B/66B blocks from multiple clients are adapted to the FlexE group using a calendar function that distributes them to the 100GBASE-R PHYs in the FlexE group. The calendar subdivides each 100 Gb/s PHY into 20 slots, and the FlexE shim adaptation multiplexes/demultiplexes all 64B/66B blocks from a FlexE client into/from the same set of calendar slots. 200 Gbit/s and 400 Gb/s Ethernet PHYs were added in OIF FlexE IA 2.0.

As an example of FlexE, four clients each with a rate of 75 Gb/s, which is not an IEEE802.3 rate, could be supported by a FlexE group including three 100GBASE-R PHYs. The FlexE group acts as a 300 Gb/s Ethernet link.

An emerging technology in ITU-T SG15 called "Metro Transport Network" (MTN) is being standardized as well. It was originally called "Slicing Packet Network," or SPN. An interface Recommendation G.mtn was started in Question 11 of SG15 in October 2018. It can be used to accomplish a type of hard network slicing (a type of virtual private networking) for wireless and optical transport applications. MTN adds a switching function to the 64B/66B blocks of the FlexE client so that the stream of blocks can traverse FlexE links without having to be adapted back to MAC frames at every hop. FlexE technology only provides big links between Ethernet switches so MAC frames from a FlexE client are re-constituted at every FlexE link hop and may subsequently be forwarded by IEEE802.1 bridging. MTN technology allows the 64B/66B blocks of the FlexE client stream to be switched at the egress of a FlexE link. MTN uses FlexE logic for the calendaring and multiplexing/demultiplexing functions over the Ethernet PHYs of OIF FlexE IA 2.0.

MTN has a path layer and a section layer. The path layer includes a switching function from which a path layer network can be formed. In FIG. 1, the FlexE client stream of blocks is present at the Path Forwarding End Point (FwEP). For the OIF FlexE case, there is no flexibility to switch the blocks from the Path FwEP, and they are bound to Path Forwarding Points ("Path FP"). Below the Path FPs, the FlexE shim and calendaring function are performed, and 64B/66B blocks are placed into 5 Gbit/s calendar slots.

The bonding of links to form a higher aggregate rate is a general method found across packet and TDM technologies. Bonding of wireless links also exists. While the use of Ethernet LAG is known for wireless links, the use of FlexE is not. In this invention, wireless links that modulate/demodulate 64B/66B encoded bit-streams are bonded using the OIF FlexE shim and adaptation. These wireless bonded links must use the same physical layer clock. 64B/66B blocks at the Path FwEP in the above diagram would flow to the FlexE calendaring function and FlexE clients multiplexed using the FlexE shim.

64B/66B is a line code that transforms 64-bit data to a 66-bit block to provide enough state changes to allow reasonable clock recovery and alignment of the data stream at the receiver. 64B/66B was defined by the IEEE 802.3 working group as part of the IEEE 802.3ae-2002 amendment which introduced 10 Gbit/s Ethernet, the contents of which are incorporated by reference. An output of 64B/66B encoding is a 66B block. As described herein, FlexE and MTN include a stream of blocks which can be referred to herein as 64B/66B block streams or a stream of 66B blocks.

The various embodiments described herein are with reference to 64/66B blocks, which is an output of 64/66B encoding. That is, the 66B block is a block of bits based on a line code, which in this case is 64/66B encoding. There are other types of line codes, and the present disclosure equally contemplates use therein with respect to FlexE or MTN. For example, another type of line code is 256 B/257 B encoding. Here, 256 bits of data are encoded into 257 B blocks. It is expected that FlexE or MTN may also support 256 B/257 B blocks in addition to 64B/66B blocks.

In the present disclosure, instead of continuing to the rest of the IEEE 802.3 clause 82 stack and below (Physical Medium Attachment (PMA), Physical Medium Dependent (PMD)), the stream would go to wireless links capable of modulating/demodulating 64B/66B blocks. This would be below the Section Forwarding Endpoint (FwEP). The foregoing description is presented with respect to 64B/66B blocks for FlexE or MTN. Those of ordinary skill in the art will appreciate the present disclosure contemplates any types of blocks for FlexE or MTN for transmission over wireless links.

As wireless links are subject to factors (e.g., atmospheric, spacial) that can cause their bit rate to vary, links with a Guaranteed Bit Rate (GBR) service should be used at the Section Forwarding EndPoint (FwEP). If not available, then a mechanism to provide a constant bit rate to the FlexE calendaring function is needed. This mechanism could be implemented with a leaky bucket and a queueing buffer. The FlexE idle mapped procedure can be utilized to subrate and match the GBR to the appropriate resource (slice). For example, a buffer between the calendaring function and the wireless link.

The present disclosure applies to the case where FlexE links are used (the OIF IAs) as well as for the MTN case where there the 64B/66B block stream can be switched.

FIG. 2A is a network diagram of a network 10 illustrating an end-to-end MTN circuit 12 utilizing a 5G wireless point to multi-point link 14 as part of its path. The network 10 includes connectivity of the end-to-end MTN path connection 12 between an Ethernet switch 16 and a network device 18. The 5G wireless point to multi-point link 14 includes cell tower 20 at the point that is wirelessly connected to one or more microwave devices 22 at the multipoint. The end-to-end MTN circuit 12 traverses over multiple 5G wireless links 36. The 5G wireless links 36 can be bookended by edge devices 24, 26 and corresponding Virtual Network Functions (VNFs) 28, 30. For example, the VNF 28 can be an evolved Node B (eNB) or gNodeB (gNB) and the VNF 30 can be User Equipment (UE). We are also contemplating other ways to implement the VNF functionality, including with hardware based wireless transmitting points (TPs) such as hardware eNBs, gNBs, 802.11 wireless access points, 802.11 wireless routers, 802.11 mesh routers, satellite terrestrial transmitters and satellite relays, and hardware UEs (e.g. cellular phones or cellular modems). Further, the network 10 can include an MTN controller 32 with control connectivity to the Ethernet switch 16, the network device 18, edge devices 24, 26, and corresponding Virtual Network Functions (VNFs) 28, 30. A 5G controller 34 also has control connectivity to the MTN controller 32. The MTN controller 32 is configured to provision the FlexE calendar in the devices it has control connectivity to, and the 5G controller is configured to provision Quality of Service (QoS).

FlexE or MTN Path client data may originate at Ethernet switch 16, be switched over a FlexE group over optical Ethernet links, and arrives at the edge device 24. Then, it is switched in the MTN path layer to an egress microwave links 36 in the 5G wireless point to multi-point link 14. FlexE or MTN path client data at the output of the microwave link 36 is switched to an egress FlexE group over optical Ethernet links 38. The end-to-end MTN path connection 12 is configured by setting up calendar slots on the Ethernet switch 16, the network device 18, and the edge devices 24 and 26 respectively, and setting up calendar slots with wireless QoS requirements on the microwave link 36.

In FIG. 2A, the example end-to-end MTN path connection 12 is illustrated traversing the 5G wireless point to multi-point link 14. Of course, other embodiments are also contemplated. The end-to-end MTN circuit 12 includes FlexE, i.e., a 64B/66B block stream that is distributed based on the calendar. FIG. 2B depicts the devices and links that the MTN path connection 12 of FIG. 2 in a simplified system 100. A corresponding functional architecture is given in 101. The MTN Path connection 12 (of FIG. 2A) would start at the Ethernet switch 16, is adapted to the MTN Path layer in 110, then enters the MTN switching function 120 which was provisioned by the MTN Controller 32 (of FIG. 2A). It is switched to the MTN Section layer 130 which contains the calendar mapping function. 64B/66B blocks are distributed to calendar slots in the PCS and lower functions of Ethernet PHYs 140 as described herein. The 64B/66B block stream of the FlexE or MTN path client is bonded over two Ethernet PHYs and modulated over optical fibres 150. At the receiving end on device 24, the data is demodulated and the calendaring function of the MTN Section layer recovers the 64B/66B block stream of the MTN Path connection 12 (of FIG. 2A). The MTN Path switching function 121 is configured by MTN controller 32 to send the stream to the MTN Section layer 131. The calendar mapping function distributes 64B/66B blocks to calendar slots in the wireless link functions 141 prior to wireless modulation. The 64B/66B block stream is the data lane stream 64 (of FIG. 3) which for this example is sent by the data plane to wireless data plane mapper 50 (of FIG. 3) to the transport buffer creation 74 (of FIG. 3) function as a bit stream. The bits are then sent to a wireless modulation function and transmitted. The 64B/66B block stream of the FlexE or MTN path client is bonded over two wireless PHYs and modulated over wireless links 151. At the receiving end, on device 26, the data is demodulated and the calendaring function of the MTN Section layer recovers the 64B/66B block stream of the MTN Path connection 12 (of FIG. 2A). The MTN Path switching function 122 is configured by MTN controller 32 to send the stream to the MTN Section layer that bonds it over two Ethernet PHYs which are modulated over optical fibres 152. At the receiving end, on device 18, the data is demodulated and the calendaring function of the MTN Section layer recovers the 64B/66B block stream of the MTN Path connection 12 (of FIG. 2A). The MTN Path switching function 123 is configured by MTN controller 32 to send the stream to the MTN Path layer 111 which outputs MAC frames from the 64B/66B block stream. This is the end of the MTN Path connection 12.

A wireless resources scheduler, such as via the 5G controller 34, can be configured to schedule the data from this bit stream in a way that achieves its required quality of service over the wireless links 151 (of FIG. 3). The end-to-end path is set up by setting up scheduling calendar slots on the ethernet devices and setting up wireless QoS requirements by the MTN controller 32.

FIG. 3 is a block diagram of a system 40 configured to interface 64B/66B blocks between wireless frames via a mapper 50 between a wired domain 52 and a wireless domain 54.

Within the edge devices 24, 26 that originate/terminate the microwave links 36, a FlexE calendar function 60, in a calendar mapper 62, maps 64B/66B blocks into a FlexE frame that is used to allocate 64B/66B blocks to sub-calendars for each of the microwave links 36, to data lane streams 64 that interface the mapper 50. For a 100 Gb/s PHY, each sub-calendar can have a granularity of 5 Gb/s, i.e., 20 calendar slots. The data lane streams 64 are streams of FlexE client data (or MTN path layer clients), namely a stream of 64B/66B blocks. For example, the data lane streams can be equal to the sub-calendar, e.g., 5 Gb/s. Again, 20 calendar slots of 5 Gb/s each is currently standardized for FlexE, but it is expected that there will be different rates in the future. These future rates are also contemplated with the present disclosure.

The wireless domain 54 includes a Packet Data Convergence Protocol (PDCP) mapper 70 that interfaces a Radio Link Control (RLC) layer 72 that interfaces a transport buffer 74. The transport buffer 74 connects to a modulation device 76 that connects to a spectrum resource mapper 78 that supports wireless transmission. FIG. 3 is illustrated in a single direction, transmission from left to right. Of course, a practical embodiment with bidirectional communication would support the same functions in both directions.

The PDCP mapper 70 encapsulates data into an IP packet (among other functions) that are wireless domain datagrams. The RLC layer 72 provides buffering of bytes to match an incoming data stream with the wireless channel and reliable transmission of bytes over the wireless channel (layer 2 functionalities). The transport buffer 74 function performs i) layer 1 wireless functionality and hybrid Automatic Repeat Request (ARQ) to deal with fading channels, ii) creation of buffers of coded bits created in a size that can be mapped on available spectrum and time resources (Orthogonal Frequency-Division Multiplexing (OFDM) symbols), iii) coding such as Low-Density Parity-Check (LDPC), polar, Turbo Product Code (TPC) (some bits may be removed from the coded buffer to create punctured codes), and iv) the like. The modulation device 76 includes creating symbols (time waveforms) from coded bits. The spectrum resource mapper 78 may work with modulation to assign bits to wireless spectrum or in time (on OFDMA symbols or resource blocks).

The mapper 50 can be referred to as a "data lane to wireless data plane mapper" to perform adaptation between the wired domain 52 and the wireless domain 54. In the present disclosure, there are three proposed approaches for how a wireless system can transport the 64B/66B block streams. These include transport by bits, by bytes, or by encapsulation in IP packets; these are referred to herein as bit mapping, byte mapping, and packet mapping, respectively. 64B/66B streams are taken off the data lane streams 64 and are handed off to some part of the wireless data plane by the mapper 50. Depending on where they are handed off, i.e., the approach, different type of mapping/encapsulations are required.

For packet mapping, the mapper 50 provides the 64B/66B data stream to the PDCP mapper 70 via IP encapsulation. The mapper 50 can pack a 64B/66B block stream into IP packets or the like, i.e., something that can be transported over the wireless stack. IP encapsulation can include sequence numbers in the packets to ensure the 64B/66B block stream can be reconstituted in the correct order at the receiver, i.e., at an adjacent mapper 50 on the other end of the wireless domain 54.

For byte mapping, the 64B/66B block stream can be converted into a byte stream, e.g., four 66B blocks can become a 33-byte stream, and the byte stream can be provided to the RLC layer 72 using its byte Service Access Point (SAP). The RLC layer 72 provides guaranteed byte delivery so all bytes will be received in order at the receiver.

For bit mapping, the 64B/66B block stream can be transferred as is as a stream of bits to the transport buffer 74 SAP. Even further, this option could include packing the stream of bits with a header and padding to match available transport buffer 74 sizes to enable tracking of lost 66B blocks.

FIG. 4 is a block diagram of a multi-link wireless network 100 with a plurality of wireless links 102. As the bandwidth on a wireless link 102 is affected by atmospheric and other factors, a necessary condition for its use in a FlexE group is that there be a minimum guaranteed bandwidth. Use of a Guaranteed Bit Rate (GBR) service could be used. Wireless spectrum is shared by multiple wireless links 102, and each link may have a different Signal-to-Interference-Plus-Noise Ratio (SINR). Wireless spectrum may be used as multiple spatial channels, each with a different SINR.

In order to provide a GBR service, the scheduler (such as in the MTN controller 32) needs to schedule all GBR packets/bytes/bits (depending on the mapping 50 used) before all other packets/bytes/bits to ensure that sufficient resources are reserved for the MTN traffic. The minimum required bandwidth required by the MTN traffic has to be available on the wireless link 102. The minimum bandwidth can be determined by a sum of the lowest Modulation and Coding Scheme (MCS) on each spatial channel if that channel is using the full spectrum available on the link 102.

The transmit buffer 74 is required because each link 102 may have a different rate. Sometimes the aggregate rate may be smaller than the FlexE rate. A receive buffer 104 is required because each link 102 may have a different, variable, latency (due to ARQ). The receive buffer 104 orders packets/bytes/bits to be able to give them back to the FlexE stream. The mapper 50 reads the calendar and packs packets/bytes/bits into wireless links. The MTN controller 32 can be an outside entity that is required to assign which part of FlexE calendar is using which wireless links 102 (if multiple FlexE flows can be packed on the wireless FlexE group).

FIG. 5 is a flowchart of a FlexE/MTN transmission process 200 over a wireless data plane. The process 200 includes receiving data lane streams each including a stream of blocks associated with one of a Flexible Ethernet (FlexE) stream or a Metro Transport Networking (MTN) stream (step S1); and mapping the stream of blocks to data formatted for transmission over one or more wireless links by a transmit device in a wireless data plane (step S2).

The process 200 can further include receiving the formatted data from a receive device in the wireless data plane (step S3); and demapping the received data to the stream of blocks reconstituting the one of the FlexE stream or the MTN stream (step S4).

The data formatted can include packet mapping where the stream of blocks is encapsulated into packets each having a sequence number to ensure correct ordering at the demapper, and wherein the packets are provided to the wireless data plane at a Packet Data Convergence Protocol (PDCP) layer in the wireless data plane.

The data formatted can include byte mapping where the stream of blocks is converted into a byte stream that is provided to a Radio Link Control (RLC) layer in the wireless data plane that guarantees byte delivery in order at the demapper.

The data formatted can include bit mapping wherein the stream of blocks is transferred as a stream of bits to a transport buffer Service Access Point (SAP) in the wireless data plane.

The process 200 can further include buffering the data formatted prior to transmission; and controlling the buffering based on the one or more wireless links.

In another embodiment, a mapper includes circuitry configured to receive data lane streams each of which is a stream of data based on a calendar function associated with one of Flexible Ethernet (FlexE) or Metro Transport Networking (MTN); and circuitry configured to perform mapping of each of the data streams and to provide an output of the mapping to a device in a wireless data plane for transmission over one or more wireless links.

The stream of data can include a stream of blocks sized based on a line encoding technique. The mapping can include packet mapping where the stream of blocks is encapsulated into packets each having a sequence number to ensure correct ordering at a receiver, and wherein the packets are provided to the wireless data plane at a Packet Data Convergence Protocol (PDCP) layer in the wireless data plane.

The mapping can include byte mapping where the stream of blocks is converted into a byte stream that is provided to a Radio Link Control (RLC) layer in the wireless data plane that guarantees byte delivery in order at a receiver. The mapping can include bit mapping wherein the stream of blocks is transferred as a stream of bits to a transport buffer Service Access Point (SAP) in the wireless data plane. The stream of data can include a stream of 64B/66B blocks, and wherein the data lane streams are each about 5 Gb/s corresponding to one of 20 calendar slots in a 100 Gb/s FlexE frame. The data lane streams can be a plurality of streams, and each is transported over a different wireless link.

In a further embodiment, a system includes a mapper configured to receive data lane streams each including a stream of blocks associated with one of a Flexible Ethernet (FlexE) signal or a Metro Transport Networking (MTN) signal, and map the stream of blocks to data formatted for transmission over one or more wireless links by a transmit device in a wireless data plane; and a demapper configured to receive the formatted data from a receive device in the wireless data plane, and demap the received data to the stream of blocks reconstituting the one of the FlexE signal or the MTN signal.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A mapper comprising:
circuitry configured to receive data streams, each is a stream of data based on a calendar function associated with one of Flexible Ethernet (FlexE) and Metro Transport Networking (MTN), wherein the stream of data is one of a FlexE signal and MTN signal; and
circuitry configured to perform mapping of each of the data streams and to provide an output of the mapping to a device in a wireless data plane for transmission over a plurality of wireless links with a wireless physical (PHY) layer thereon including blocks based on the one of FlexE and MTN, wherein the one of a FlexE signal and MTN signal has a portion thereof transmitted on each of the plurality of wireless links based on the calendar function, wherein the mapping is a data lane to wireless data plane mapping configured to perform adaptation between a wired domain and a wireless domain, the adaptation replacing a physical Ethernet layer below the calendar function with a wireless PHY interface that modulates and transmits the calendar-based blocks over the plurality of wireless links, and wherein the stream of data includes a stream of blocks sized based on a line encoding technique.

2. The mapper of claim 1, wherein the mapping includes packet mapping where the stream of blocks is encapsulated into packets each having a sequence number to ensure correct ordering at a receiver, and
wherein the packets are provided to the wireless data plane at a Packet Data Convergence Protocol (PDCP) layer in the wireless data plane.

3. The mapper of claim 1, wherein the mapping includes byte mapping where the stream of blocks is converted into a byte stream that is provided to a Radio Link Control (RLC) in communication with a Packet Data Convergence Protocol (PDCP) layer in the wireless data plane that guarantees byte delivery in order at a receiver, wherein the RLC is configured to provide buffering to the stream of blocks.

4. The mapper of claim 1, wherein the mapping includes bit mapping wherein the stream of blocks is transferred to a Radio Link Control (RLC) layer as a stream of bits to a transport buffer Service Access Point (SAP) in the wireless data plane that is configured to match a physical rate, a bit rate, or an aggregate rate of the stream of blocks to a rate of the wireless PHY layer with idle mapping.

5. The mapper of claim 1, wherein the stream of data includes a sequence of 64B/66B blocks, and wherein the data streams are each about 5 Gb/s corresponding to one of 20 calendar slots in a 100 Gb/s FlexE frame.

6. The mapper of claim 1, wherein the plurality of wireless links are microwave links.

7. The mapper of claim 1, wherein the line encoding technique is either 64/66B encoding or 256 B/257 B encoding.

8. A system comprising:
a mapper configured to
receive data streams, each including a stream of blocks associated with one of a Flexible Ethernet (FlexE) signal or a Metro Transport Networking (MTN) signal, wherein the stream of data is one of a FlexE signal and MTN signal, and
map the stream of blocks to data formatted for transmission over a plurality of wireless links by a transmit device in a wireless data plane with a wireless physical (PHY) layer on the plurality of wireless links including the stream of blocks based on the one of FlexE and MTN, wherein the mapping is data lane to wireless data plane mapping configured to perform adaptation between a wired domain and the wireless domain, wherein the one of a FlexE signal and MTN signal has a portion thereof transmitted on each of the plurality of wireless links based on a calendar function, wherein the mapping is a data lane to wireless data plane mapping configured to perform adaptation between a wired domain and a wireless domain, the adaptation replacing a physical Ethernet layer below the calendar function with a wireless PHY interface that modulates and transmits the calendar-based blocks over the plurality of wireless links, and wherein the stream of data includes a stream of blocks sized based on a line encoding technique; and a demapper configured to
 receive second formatted data from a receive device in the wireless data plane, and
 demap the received second formatted data to a second stream of blocks reconstituting the one of the FlexE signal and the MTN signal.

9. The system of claim 8, wherein the data formatted includes packet mapping where the stream of blocks is encapsulated into packets each having a sequence number to ensure correct ordering at a second demapper, and
 wherein the packets are provided to the wireless data plane at a Packet Data Convergence Protocol (PDCP) layer in the wireless data plane.

10. The system of claim 8, wherein the data formatted includes byte mapping where the stream of blocks is converted into a byte stream that is provided to a Radio Link Control (RLC) layer in the wireless data plane that guarantees byte delivery in order at a second demapper.

11. The system of claim 8, wherein the data formatted includes bit mapping wherein the stream of blocks is transferred as a stream of bits to a transport buffer Service Access Point (SAP) in the wireless data plane.

12. The system of claim 8, wherein the stream of data includes a sequence of 64B/66B blocks, and wherein the data streams are each about 5 Gb/s corresponding to one of 20 calendar slots in a 100 Gb/s FlexE frame.

13. The system of claim 8, wherein the plurality of wireless links are microwave links.

14. The system of claim 8, further comprising
 a transmit buffer between the mapper and the wireless data plane; and
 a receive buffer between the demapper and the wireless data plane,
 wherein the transmit buffer and the receive buffer are configured to match a rate of the stream of blocks to a rate of the wireless PHY layer with idle mapping.

12

15. A method comprising:
 receiving data streams, each including a stream of blocks associated with one of a Flexible Ethernet (FlexE) stream or a Metro Transport Networking (MTN) stream, wherein the stream of data is one of a FlexE signal and MTN signal; and
 mapping the stream of blocks to data formatted for transmission over a plurality of wireless links by a transmit device in a wireless data plane with a wireless physical (PHY) layer on the plurality of wireless links including the stream of blocks based on the one of FlexE and MTN, wherein the mapping is data lane to wireless data plane mapping configured to perform adaptation between a wired domain and the wireless domain, wherein the one of a FlexE signal and MTN signal has a portion thereof transmitted on each of the plurality of wireless links based on a calendar function, wherein the mapping is a data lane to wireless data plane mapping configured to perform adaptation between a wired domain and a wireless domain, the adaptation replacing a physical Ethernet layer below the calendar function with a wireless PHY interface that modulates and transmits the calendar-based blocks over the plurality of wireless links, and wherein the stream of data includes a stream of blocks sized based on a line encoding technique.

16. The method of claim 15, further comprising receiving second formatted data from a receive device in the wireless data plane; and
 demapping the received second formatted data to a second stream of blocks reconstituting the one of the FlexE signal or the MTN signal.

17. The method of claim 15, wherein the data formatted includes packet mapping where the stream of blocks is encapsulated into packets each having a sequence number to ensure correct ordering at a receiver, and
 wherein the packets are provided to the wireless data plane at a Packet Data Convergence Protocol (PDCP) layer in the wireless data plane.

18. The method of claim 15, wherein the data formatted includes byte mapping where the stream of blocks is converted into a byte stream that is provided to a Radio Link Control (RLC) layer in the wireless data plane that guarantees byte delivery in order at a receiver.

19. The method of claim 15, wherein the data formatted includes bit mapping wherein the stream of blocks is transferred as a stream of bits to a transport buffer Service Access Point (SAP) in the wireless data plane.

20. The method of claim 15, further comprising
 buffering the data formatted prior to transmission that is configured to match a rate of the stream of blocks to a rate of the wireless PHY layer with idle mapping; and
 controlling the buffering based on the plurality of wireless links.

* * * * *